J. G. BÜHLER & W. B. PYE.
Grain-Drier.

No. 214,237. Patented April 15, 1879.

Attest:
W. L. Baker.
C. B. Baker.

Inventors:
John G. Bühler,
William B. Pye,
By R. C. Dyrenforth,
Attorney.

2 Sheets—Sheet 2.

J. G. BÜHLER & W. B. PYE.
Grain-Drier.

No. 214,237. Patented April 15, 1879.

Attest:
W. L. Baker
C. B. Baker

Inventors:
John G. Bühler,
William B. Pye,
By R. H. Dyrenforth,
Attorney.

UNITED STATES PATENT OFFICE.

JOHN G. BÜHLER AND WILLIAM B. PYE, OF CHICAGO, ILLINOIS, ASSIGNORS OF ONE-THIRD THEIR RIGHT TO FRANKLIN S. HANSON, OF SAME PLACE.

IMPROVEMENT IN GRAIN-DRIERS.

Specification forming part of Letters Patent No. 214,237, dated April 15, 1879; application filed November 18, 1878.

*To all whom it may concern:*

Be it known that we, JOHN G. BÜHLER and WILLIAM B. PYE, both of the city of Chicago, in the county of Cook and State of Illinois, have invented certain new and useful Improvements in Grain-Driers; and we hereby declare the following to be a full, clear, and exact description thereof, reference being had to the accompanying drawings, of which—

Figure 1:
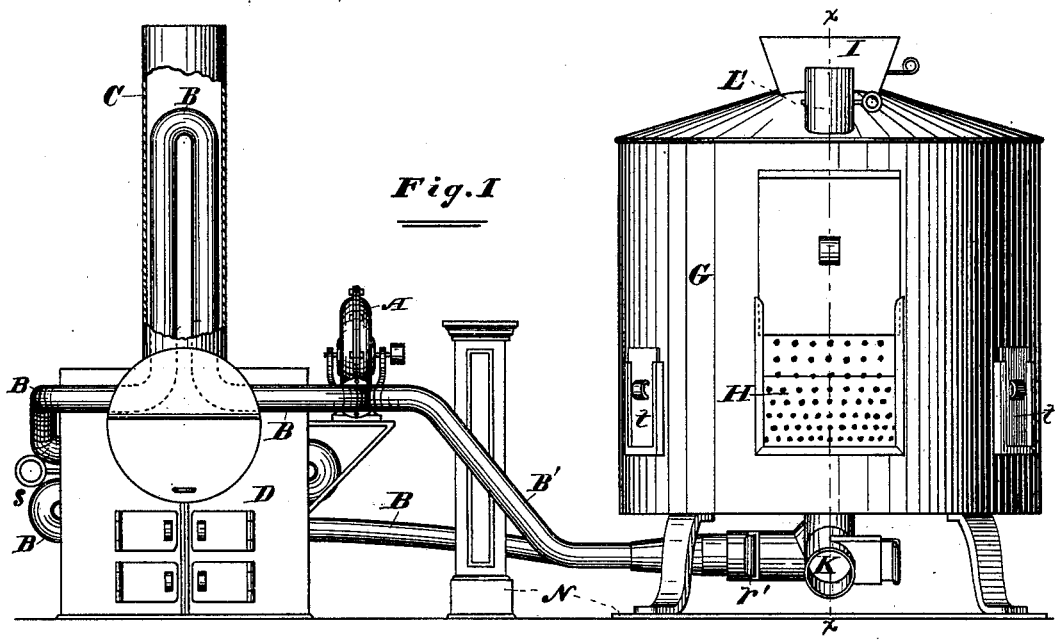
Figure 2:
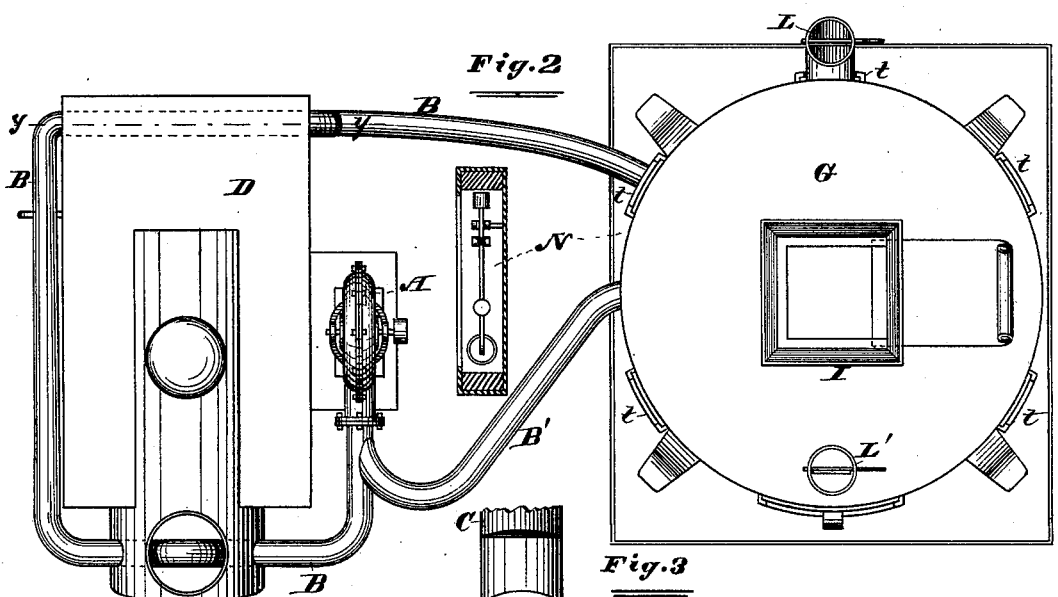
Figure 3:
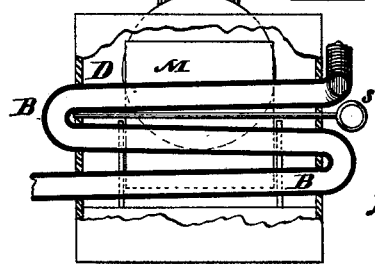
Figure 7:
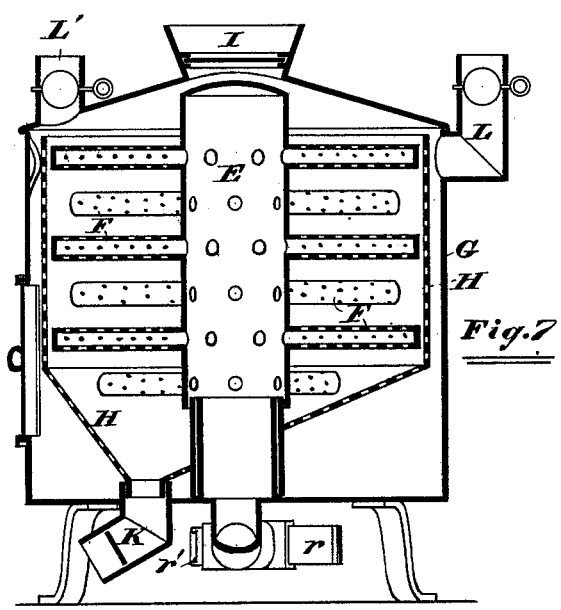
Figure 4:
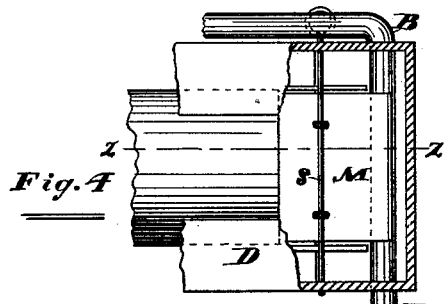
Figure 5:
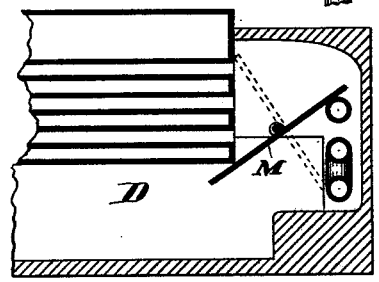
Figure 8:
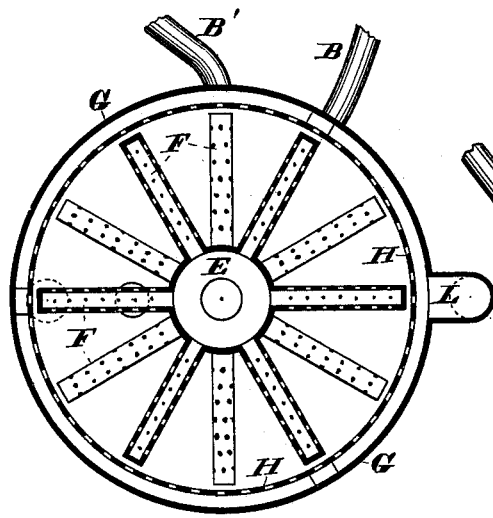
Figure 6:
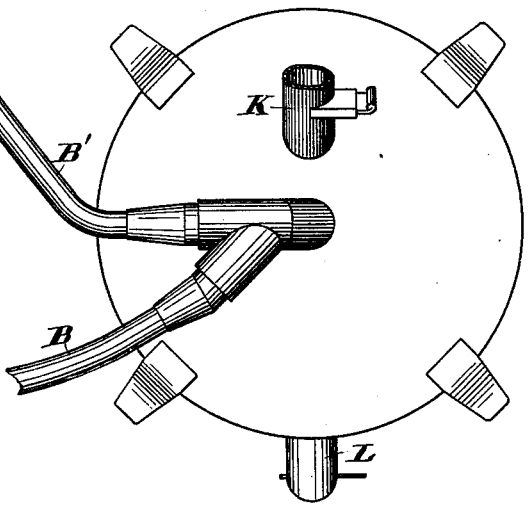

Figure 1 is an end elevation of the drier with the bin standing upon a scale; Fig. 2, a top view of the same; Fig. 3, a vertical cross-section on the line $y\ y$, Fig. 2; Fig. 4, a sectional plan view, showing a detail; Fig. 5, a vertical section on the line $z\ z$, Fig. 4; Fig. 6, a bottom view of the bin; Fig. 7, a vertical section of the bin and air-distributing device, taken on the line $x\ x$, Fig. 1; and Fig. 8, a horizontal section of the same.

Our invention relates to driers suitable for every species of grain; and our object is to produce an apparatus for this purpose in which the grain shall be rapidly, thoroughly, and equally dried by means of hot air in a pure state—that is to say, not contaminated by contact with the products of combustion.

To this end our invention consists, first, in the means for distributing hot air under pressure intimately throughout the grain, such means comprising a fan or blower, a pipe leading therefrom passing through the furnace, wherein it is convoluted into a gate, and leading into a hollow vertical shaft extending up the center of the bin, from all sides of which shaft numerous perforated pipes radiate, the said bin being stationary, and provided with suitable openings for the escape of the hot air and vapors; secondly, in the device for forcing and heating the air and conveying it into the drying-bin, consisting of a fan or blower and a pipe leading therefrom, which pipe passes into the interior of the chimney, thence up the same to a sufficient height, and down again and out, then through the furnace, and finally into the drying-bin; thirdly, in the construction of the bin and the air-distributing device within the same; and, fourthly, in having the grain bin stand upon a platform-scale, whereby the drying may be regulated to any required degree by observing the variation in weight, all as hereinafter more fully set forth.

Referring to the drawings, A is an ordinary blower, placed in any convenient position, (remote from the furnace, if necessary,) and run by the machinery of the mill, which blower forces air into the pipe B.

The pipe B passes into the chimney C of the ordinary boiler-furnace D at or near the base of the same, and is continued up the interior of the said chimney nearly to the top, and then down again to the base, where it passes out. It then extends back to and enters the rear of the said furnace D, and is there coiled back and forth, forming a gate of convoluted pipe in the line of passage of the hot products of combustion, and is thence continued on to the base of the grain-bin, (which latter may be placed in any convenient part of the building,) where it connects with the hollow shaft E, which extends up the center of the said grain-bin nearly to its top. Communication between the pipe B and shaft E is controlled by means of a valve, $r$. The upper end of the shaft E is inclosed.

F F are small pipes, closely perforated, communicating with the interior of the shaft E, and branching out horizontally in all directions. As many as possible of these branch pipes should be employed in order to obtain the best results.

The bin is formed of the close outer case, G, and inner perforated case, H, an annular space subsisting between the two, as shown in the drawings.

The perforated case H is the receptacle for the grain, and is charged through a hopper, I, and discharged by a valved chute, K, toward which the bottom of the said case H inclines from all sides.

L and L' are pipes passing, respectively, out of the sides and top of the case G for the escape of the hot air and vapors, and these pipes may be employed in any required number.

M is a deflector within the furnace, at the rear of the same, worked from without by means of a rod, $s$. When this deflector is in the position represented in Fig. 5, all the hot products of combustion are brought into immediate contact with the pipe B; but when it is turned as indicated by the dotted lines the pipe B is shielded. If not permanently shielded in some manner, it is advisable to construct this part of the pipe B of refractory material in order that it may withstand the heat.

B' is the cold-air branch of the pipe B, passing from the blower immediately to the base of the shaft E, and provided with a valve, r'.

The case G may be provided with valved ports t, for the purpose of testing the progress of the drying and ascertaining when it is complete. For this purpose a port is opened, and the condition, as to moisture, of the escaping air tested with the hand.

This matter of progress and completion may, however, be far more accurately determined by having the bin stand upon a platform-scale, N, as represented in Figs. 1 and 2, whereby the process may be regulated and governed according to the change in the weight of the grain, as indicated by the scale.

The operation of our drier is as follows: The bin having been charged with grain through the hopper, communication between the blower and the interior of the bin is established through the hot-air duct B, and is cut off by way of the cold-air duct B' by means of the valves provided for this purpose, and the blower set in action.

The air forced through the pipe first receives the heat of the chimney, which raises its temperature considerably before it enters the coil within the furnace, thus proportionately increasing the heat which it receives in the latter. Passing into the shaft E, it is distributed equally throughout the grain by the perforated branch pipes F.

It is essential that the hot air and vapors find a ready outlet in all directions from the body of the grain, and this necessity is perfectly met by the perforated inner receptacle. Such part of the hot air and vapor as passes into the annular space between the walls G and H finds an outlet through the pipe L, while that which passes directly upward is carried off by the pipe L'.

When the grain has become sufficiently dry the cold-air communication is opened and the hot-air supply shut off. The cooling completes the process, and the grain may be then discharged through the chute K and the bin replenished.

It will be seen that the economy of our arrangement is perfect, no extra fuel being required, since all the heating is done by the ordinary boiler-furnace, and no extra power beyond the trifling amount necessary to run the blower.

It is obvious, also, that the apparatus may be easily adapted to all different surroundings and conditions. For example, as the pipe B may be of any desired length within reasonable limits, both between the blower and the furnace and between the furnace and the bin, the latter may, if desired, be on a different floor, or even in a different building, from the one where the furnace stands; and the same is true of the location of the blower.

We do not claim, broadly, the method of drying and cooling grain by forcing air, hot or cold, as may be required, into the same, for we are aware that driers have been made in which a blower forces air through a furnace and thence into a revolving cylinder containing the grain, and also with a separate pipe passing from the blower around the furnace into such cylinder for cooling purposes; but

What we claim as new, and desire to secure by Letters Patent, is—

1. A grain-drier in which a fan or blower forces air into a pipe passing through a furnace and convoluted into a gate therein, which pipe, after leaving the furnace, leads into a vertical central shaft within a stationary grain-bin, from all sides of which shaft numerous pipes radiate, said pipes having close perforations, through which the hot air escapes into all parts of the grain, and after disseminating through the same escapes through suitable openings in the said bin, substantially as described.

2. A grain-drier in which a fan or blower forces air into a pipe, which pipe enters the chimney and passes up and down the interior of the same and out, as shown, then passes through a furnace and leads into the grain-bin, substantially as and for the purpose set forth.

3. The drying-bin comprising the outer case provided with outlet-pipes, inner perforated case having its bottom inclined toward the chute, and air-distirbuting device E F, substantially as described.

4. The bin of a grain-drier permanently mounted upon a platform-scale, substantially as and for the purpose set forth.

5. The grain-drier comprising the following-named elements: the blower A, hot and cold air pipes B B', provided with valves, furnace D, and drying-bin, the said pipe B passing up and down the interior of the chimney C, as shown, then into the interior of the said furnace, where it is convolved into a gate, and thence continuing on to the base of the drying-bin, which it enters, whereas the said pipe B' leads from the blower immediately to the base of the drying-bin, passing through neither the chimney nor furnace in its course, and the said drying-bin consisting of the outer cylindrical case, G, having outlet-openings L L' and hopper I, inner perforated case, H, with its bottom inclined toward a discharge-chute, K, and air-distributing device embracing the central vertical shaft E, inclosed at its top, and forming a continuation of the pipes B B', and the radial perforated pipes F F, the whole being constructed and operating substantially as described.

JOHN G. BÜHLER.
WILLIAM B. PYE.

In presence of—
P. C. DYRENFORTH,
S. W. TOBEY.